United States Patent [19]
Pearce et al.

[11] Patent Number: 5,805,880
[45] Date of Patent: Sep. 8, 1998

[54] OPERATING SYSTEM INDEPENDENT METHOD FOR AVOIDING OPERATING SYSTEM SECURITY FOR OPERATIONS PERFORMED BY ESSENTIAL UTILITIES

[75] Inventors: John J. Pearce; Craig S. Jones, both of Austin, Tex.

[73] Assignee: Dell USA, LP, Round Rock, Tex.

[21] Appl. No.: 592,501

[22] Filed: Jan. 26, 1996

[51] Int. Cl.[6] ...................................................... G06F 9/06
[52] U.S. Cl. .......................... 395/652; 395/186; 395/479; 395/200.41
[58] Field of Search ................................... 395/651, 652, 395/726, 474, 479, 200.35, 200.41, 200.43, 200.46, 200.38, 186

[56] References Cited

U.S. PATENT DOCUMENTS

| | | | |
|---|---|---|---|
| 4,547,849 | 10/1985 | Louie et al. | 395/823 |
| 4,882,674 | 11/1989 | Quint et al. | 395/200.41 |
| 5,146,575 | 9/1992 | Nolan, Jr. | 395/491 |
| 5,349,673 | 9/1994 | Yasuda | 395/652 |
| 5,446,841 | 8/1995 | Kitano et al. | 395/200.43 |
| 5,448,711 | 9/1995 | Yarkoni et al. | 395/652 |

*Primary Examiner*—Kevin A. Kriess
*Attorney, Agent, or Firm*—Skjerven, Morrill, MacPherson, Franklin & Friel LLP; Ken J. Koestner

[57] ABSTRACT

An essential utility routine accesses a protected computer system component by making a call to a coprocessor that performs a desired function to avoid security measures imposed by an operating system. Various suitable coprocessors include an additional coprocessor connected to a host processor running the operating system imposing the security measures such as a coprocessor on a add-in card to a computer system, a microcontroller, or a system management mode (SMM) program running on the host processor. The essential utility operates on a computer system having a processor operating under an operating system and a storage. The operating system includes software which limits access to the storage. The utility includes a coprocessor, a software interface and a utility routine. The coprocessor is connected to the storage and operative independent of the operating system for accessing the storage. The software interface is connected to the coprocessor and executes on the processor to control input and output operations on the processor. The utility routine executes on the processor and includes a program code operative via the software interface for activating the coprocessor to access the storage and receiving a response from the coprocessor.

22 Claims, 9 Drawing Sheets

OPERATING SYSTEM INDEPENDENT METHOD FOR AVOIDING OPERATING SYSTEM SECURITY FOR OPERATIONS PERFORMED BY ESSENTIAL UTILITIES

BACKGROUND OF THE INVENTION

1. Field of the Invention

The present invention relates to utility programs for computer systems. More specifically, the present invention relates to computer utility programs that avoid security measures of an operating system while otherwise retaining secured operation.

2. Description of the Related Art

Various computer operating systems and operating system application program interfaces (APIs) furnish security functionality that prevents access to system components. In some cases, this security functionality prevents the performance of essential maintenance operations that precondition or maintain system hardware, including magnetic storage media including disk drives, both physical and virtual. For example, OS/2™, Windows 95™ and a PC/DACS™ security routine by Mergent protect the partition sector of a hard disk drive to prevent unauthorized write operations by a virus or rogue user program. The partition sector, which is the first physical sector of a hard disk drive, stores configuration and control information for one or more operating systems so that improper write accesses to the partition sector may result in damage to the native file system of an operating system. The security provided by an operating system that prevents accesses to the partition sector is advantageous to most users of a computer system. These users virtually never have a need or desire to write to sensitive areas in the operating system, such as the partition sector. However, a select group of utility programs, routines and utilities are operational only when granted a capability to access any and all locations of the hard disk drive at will.

A make suspend to disk (MKS2D) utility is one example of a routine having a functionality that depends on accessibility of the partition sector. The MKS2D utility, which is useful in system power management, stores the operating registers of a computer onto the disk drive prior to power-down of the computer.

What is needed is a technique for avoiding the security measures imposed by an operating system while otherwise maintaining security. In particular, what is needed is a technique for avoiding security measures protecting a hard disk drive that does not pose a risk to security in general. What is further needed is a technique which avoids, but does not void, operating system security and which does not open a computer system component to intrusion.

SUMMARY OF THE INVENTION

In accordance with the present invention, an essential utility routine accesses a protected computer system component by making a call to a coprocessor that performs a desired function to avoid security measures imposed by an operating system. Various suitable coprocessors include an additional coprocessor connected to a host processor running the operating system imposing the security measures such as a coprocessor on a add-in card to a computer system, a microcontroller, or a system management mode (SMM) program running on the host processor.

In accordance with the present invention, a utility operates on a computer system having a processor operating under an operating system and a storage. The operating system includes software which limits access to the storage. The utility includes a coprocessor, a software interface and a utility routine. The coprocessor is connected to the storage and operative independent of the operating system for accessing the storage. The software interface is connected to the coprocessor and executes on the processor to control input and output operations on the processor. The utility routine executes on the processor and includes a program code operative via the software interface for activating the coprocessor to access the storage and receiving a response from the coprocessor.

Many advantages are achieved by the described program and method. One advantage is that essential utility operations are performed which are sufficiently specific to the precise extension basic input/output system (XBIOS) and system management mode (SMM) operations. Thus, the security of a secured operating system is not compromised while useful functions are allowed to operate which would otherwise be prohibited by the operating system. Another advantage is that the described method is widely applicable to accomplish many various storage accesses that would otherwise be prohibited due to operating system security.

In embodiments that use XBIOS to perform SMM calls, XBIOS activation is advantageous since, for security reasons, codes and keys for activating SMM may not be generally known.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
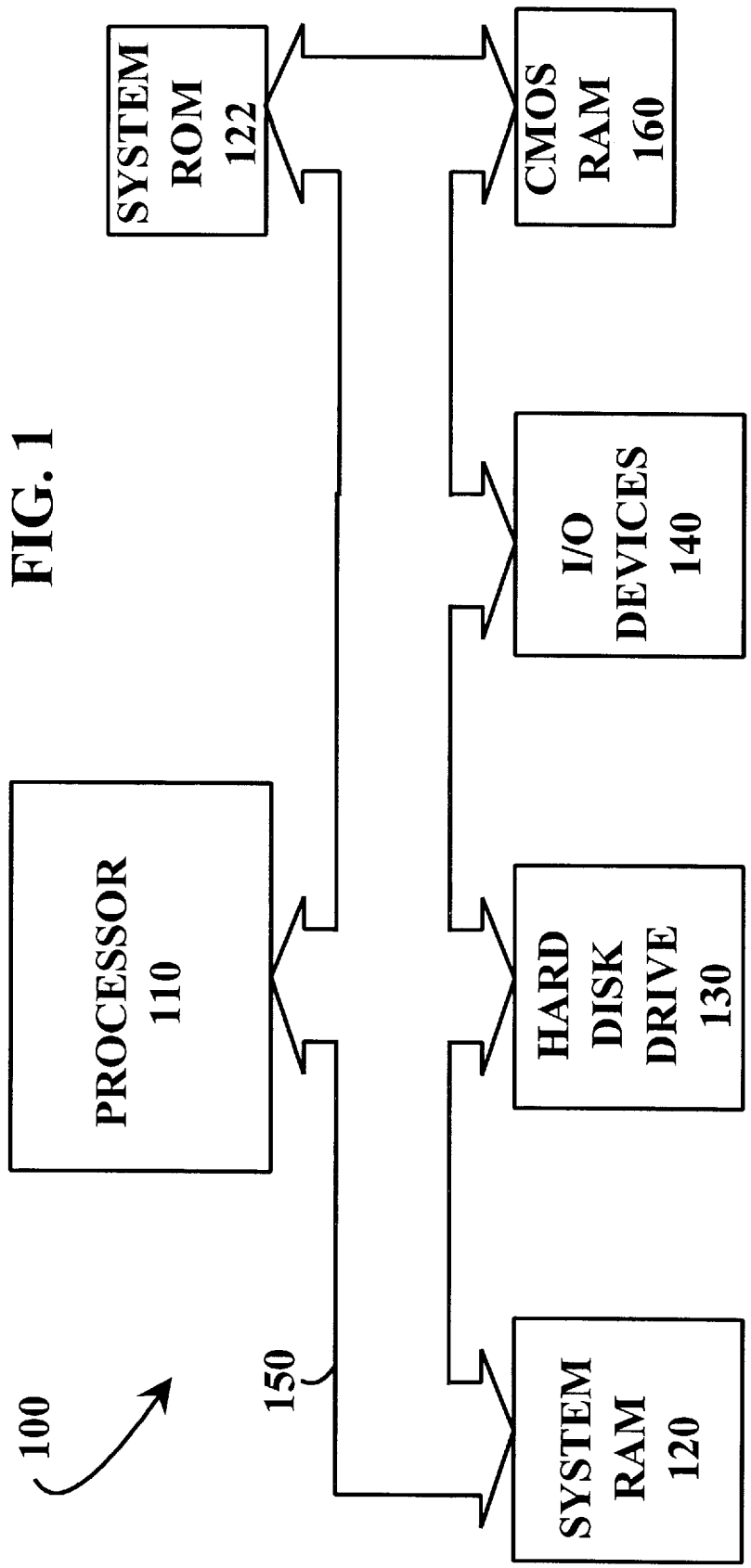
FIG. 1 is a block diagram which depicts computer system hardware implementing an operating system independent method for avoiding operating system security for operations performed by essential utilities.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486, 586 or Pentium™ processor, executes the computing operations of the computer system 100.

Figure 2:
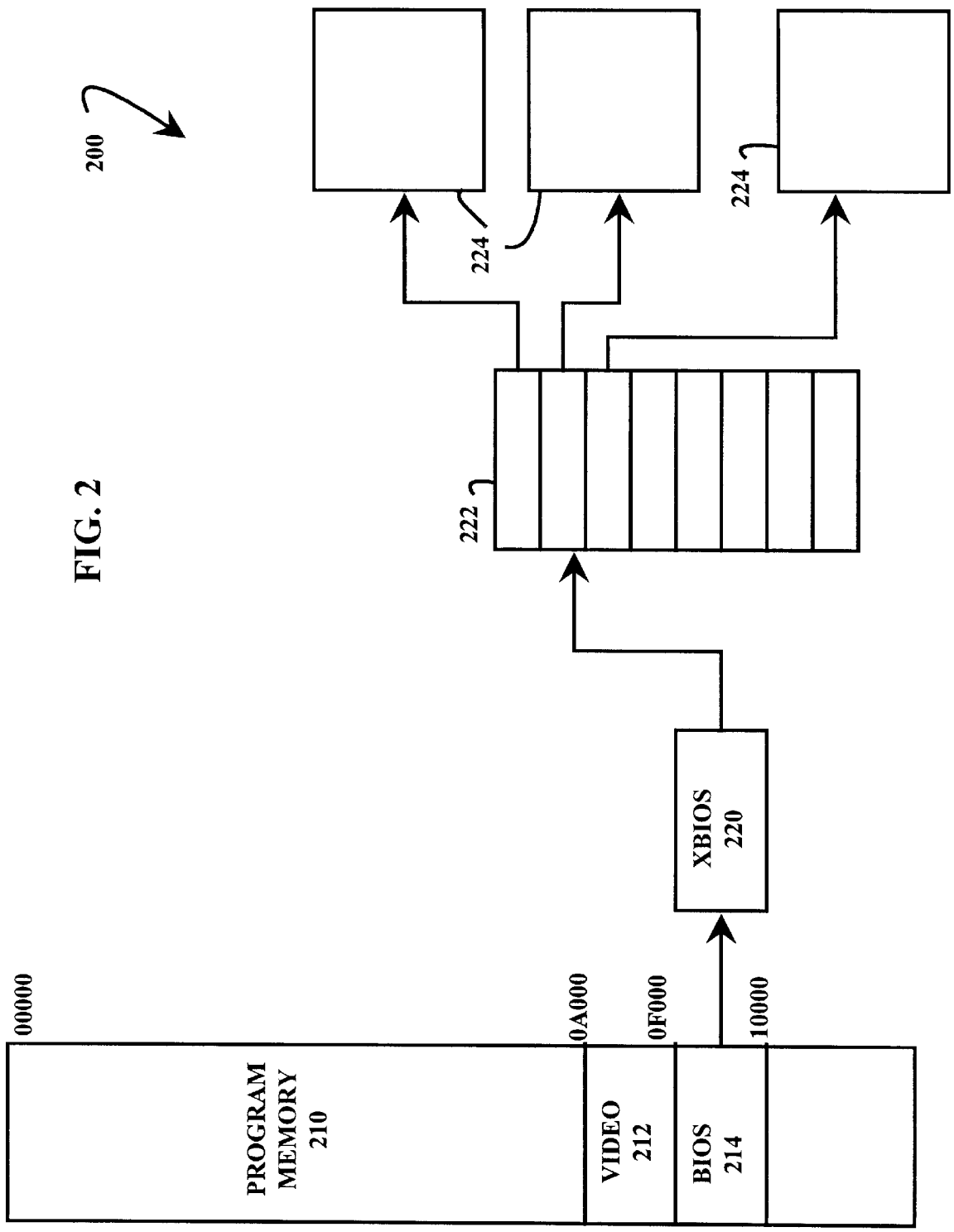
FIG. 2 is a pictorial illustration of a memory map of memory in the computer system shown in FIG. 1.

Referring to FIG. 2, a memory map 200 of a computer system shows a program memory 210 having a starting address of 0000H, a video memory 212 with a starting address of 0A000H and a BIOS memory 214 located at addresses 0F000H to 0FFFFH. A basic input output system (BIOS) is the part of an operating system that customizes the operating system to a specific computer. The BIOS forms the lowest-level interface to common devices such as a system clock, hard disk and display, for example. The BIOS memory 214 includes information for interfacing to an extension basic input output system XBIOS 220.

The XBIOS 220 extends BIOS functionality of a computer system. In particular, various computer system integrators include an XBIOS memory 220 to furnish extended features to the standard BIOS functionality. Some of these features are included to facilitate usage of programs for the benefit of the computer user. Specifically, with respect to functionality that is achieved by an embodiment in accordance with the present invention, BIOS functionality is used to pass an address of a control block to the system management mode (SMM), which performs an operation designated by the control block. One such operation is updating of the protected partition table. Another operation is the identification of a particular physical sector location on a disk drive. Other features that are typically performed by the BIOS may include management of a battery icon for displaying battery life remaining of a rechargeable battery and operating a control panel for setting power management parameters. The features also include WinCPL, an application that enables execution of power management functions without invoking a system setup operation. WinCPL controls various security operations such as setting of a password, control of speaker volume, enablement of simulated key click, modification of display parameters such as brightness and contrast. The features further include an asset tag utility that allows a computer user to assign an asset tag for identifying a particular computer system and to read the assigned asset tag. The asset tag is useful for identifying and inventory of computer systems for accounting purposes and the like. Still another feature is a monitor.exe executable file that controls video monitor parameters such as video bias, monitor refresh rate and the like.

The XBIOS 220 stores a plurality of pointers that point to entries in an XBIOS table 222. The XBIOS table 222 includes a plurality of pointers to memory addresses for various assigned application program functions 224. Each individual XBIOS program function 224 has a separate entry in the XBIOS table 222 and a separate entry point that is stored in the XBIOS table 222.

In one mode of operation, the program code in the XBIOS 220 operates by transferring operation identifiers and parameters to the CMOS memory 160 and performing an input/output instruction that evokes a SMI# signal. The SMI# signal is a signal for activating a system management mode (SMM) of operating. When a processor 110 recognizes a SMI# signal on an instruction boundary, the processor 110 waits for all store operations to complete. The processor 110 then saves the processor register state to a region in memory called a system management RAM (SMRAM) space and begins to execute a SMM handler routine. The SMI# interrupt has a greater priority than debug exceptions and external interrupts so that SMM processing preempts debug and external interrupt conditions. Subsequent SMI# and non-maskable interrupt (NMI) requests are not acknowledged while the processor is operating in system management mode.

System management mode (SMM) processing is conventionally performed by a technique in which software routines write a defined pattern or code to a specific defined SMI input/output I/O location. A pattern is defined to be suitably complex that an incorrect and unsuitable pattern is not inadvertently set. Generally, the patterns encode a sufficient amount of operational information that this level of complexity is easily achieved. Advantageously, the pattern coding is sufficiently specific to the precise XBIOS operations invoked that the security of a secured operating system is not compromised while useful functions are allowed to operate which would otherwise be prohibited by the operating system. The writing of this pattern to the SMI I/O location generates an SMI# signal, evoking a system management mode interrupt.

Figure 3:
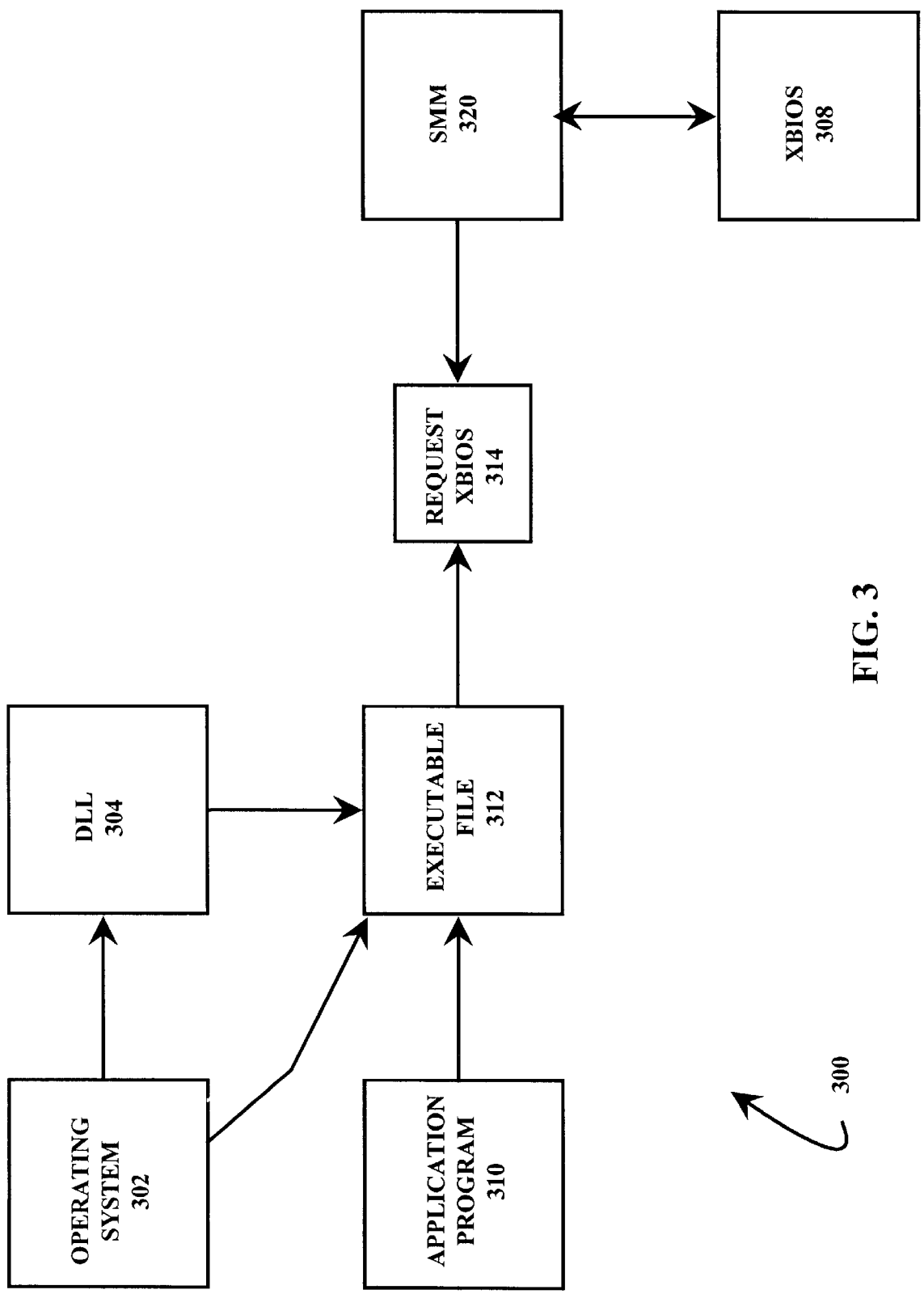
FIG. 3 is a block diagram which depicts various functional blocks of a software system that supplies full XBIOS functionality without voiding the security of the operating system.

Referring to FIG. 3, a block diagram is shown which depicts the operations of a software system 300 that supplies full XBIOS functionality. The software system 300 furnishes an interface for system management mode (SMM) operation. In this interface, an application program 310 does not directly attempt to invoke an SMI# interrupt, but instead the application program 310 calls the XBIOS 314 to request a SMM operation 320. The SMM operation 320 is activated independently of the operating system 302 operation and control.

In the software system 300, an application software program 310 is prepared for execution using dynamic linking capabilities of a target operating system 302, such as Windows NT™, Windows 95™, OS/2™ or the like, so that the dynamic linking environment includes a link step and a program loading step governed by the operating system 302. The linker scans a set of dynamic link libraries (DLL) 304. Some of the libraries include runtime support code that is linked into an executable file 312. Other libraries, called import libraries, contain references to functions that are not fully resolved until the operating system 302 loads the program executable file 312 for execution. A linker in the operating system 302 scans an import library and embeds a target module name and a numeric entry point into the executable file 312. When the operating system 302 loads the executable file 312 for execution, the operating system 302 replaces these references with addresses that are valid for usage in function calls. A dynamic link library (DLL) is a module that satisfies these references by dynamic linking. A DLL declares a set of entry points that satisfy external references.

Various libraries of the dynamic link libraries (DLL) 304 include operational code for making an XBIOS call which posts the XBIOS request 304, thereby initiating an XBIOS routine 308. The application program 310, which utilizes one or more XBIOS calls for various low-level functionality, assigns a data storage element for handling data. Typically, a known location in memory is assigned by the application program 310 for posting the signal 314 by storing information designating a particular system management function to be performed. However, some secure operating systems, such as Windows NT™, do not allow access or assignment of a particular known location in memory. Therefore in the software system 300, general purpose registers of the processor 110 are assigned to post the signal 314 and store the information designating a requested particular system management function and, upon servicing by the SMM operations 320 and XBIOS routines 308, to store a response of SMM/XBIOS processing. In some embodiments, the software system 300 assigns 16-bit general purpose registers such as AX, BX, CX and DX for storing patterns for evoking SMM operations 320 and XBIOS routines 308. In other embodiments, 32-bit registers, such as EAX, EBX, ECX and EDX are used to store activation patterns.

Figure 4:
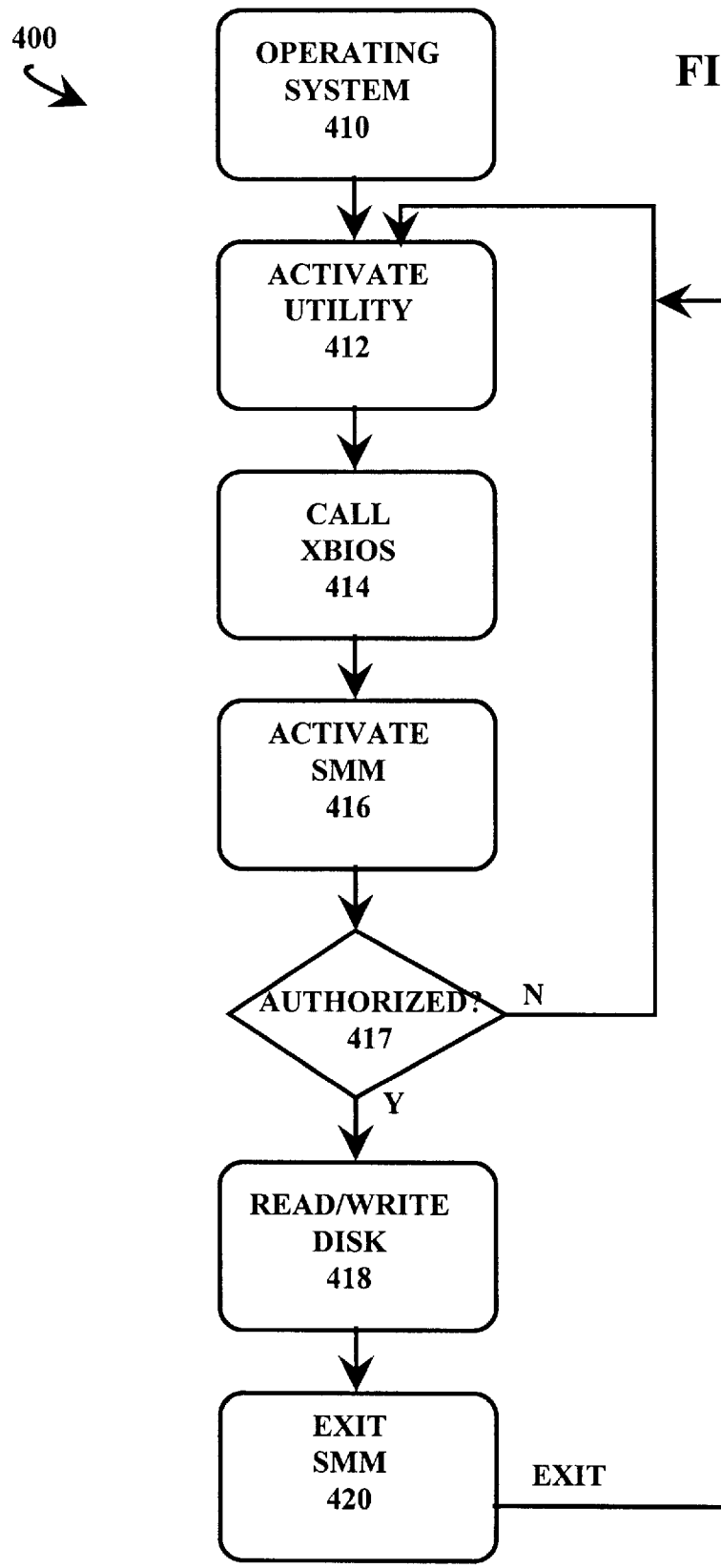
FIG. 4 is a flow chart which illustrates operations executed by an essential utility in accordance with a generic embodiment of the present invention.

Referring to the flow chart of FIG. 4, operations of the various functional blocks of a generic type of essential utility program 400 are shown. Software operates under an operating system, such as a Windows NT™, Windows 95™, OS/2™ operating system, and the like, shown in step 410. These operating systems include security protection functionality that prevents read and write access from and to selected portions of a disk drive. This protection functionality is advantageous for the computer user to prevent damage due to viruses and program bugs. However certain utility applications sought by a computer manufacturer are operable only by accessing these disk drive portions. For example, utility programs supplied by a computer manufacturer achieve useful functionality by writing information to the partition sector of a disk drive. The partition sector is often protected by various operating systems.

The essential utility program is activated, typically by a computer user, in step 412. The essential utility program may also be activated by other stimuli, such as a timer (not shown). One example of an essential utility program 412 is a make suspend to disk utility (MKS2D). The essential utility program 412 includes a code indicative of an XBIOS function request, which begins XBIOS operation in step 414. The XBIOS is a standard interface running under the Windows NT™, Windows 95™, OS/2™ and other operating systems. These operating systems emulate DOS (disk operating system) functionality. A code for activating a coprocessor, in this embodiment a system management mode (SMM) coprocessor, is included in the XBIOS operation 414. This code passes the function request originating with the essential utility program to the SMM. Typically, the function request passed to the SMM is an address of a control block activated by the SMM.

In other embodiments, the coprocessor is furnished in the form of a coprocessor on a add-in card to a computer system or a microcontroller, for example, that communicate with the processor 110 via the bus 150. The communication between two processors via a bus is well known in the computing arts.

The XBIOS operation 414 accordingly activates the system management mode (SMM) operation 416, which first determines whether the control block address is indicative of an operation that the SMM is authorized to perform when called by an XBIOS operation. This authorization test facilitates secured operation of the computer system. If the operation is not authorized, SMM is exited in step 417 and program control loops back to the essential utility program 412. Otherwise, SMM performs the function requested on the basis of the control block address that is passed to SMM. In this example, the control block address specifies that SMM perform an read or write input/output operation to a hard disk drive in step 418. When the input/output operation is complete, SMM is exited in step 420 and program control loops back to the essential utility program 412. The essential utility program 412 continuously loops until terminated, awaiting additional servicing by the SMM operations 416 whenever an additional control block address is passed to SMM.

Figure 5:
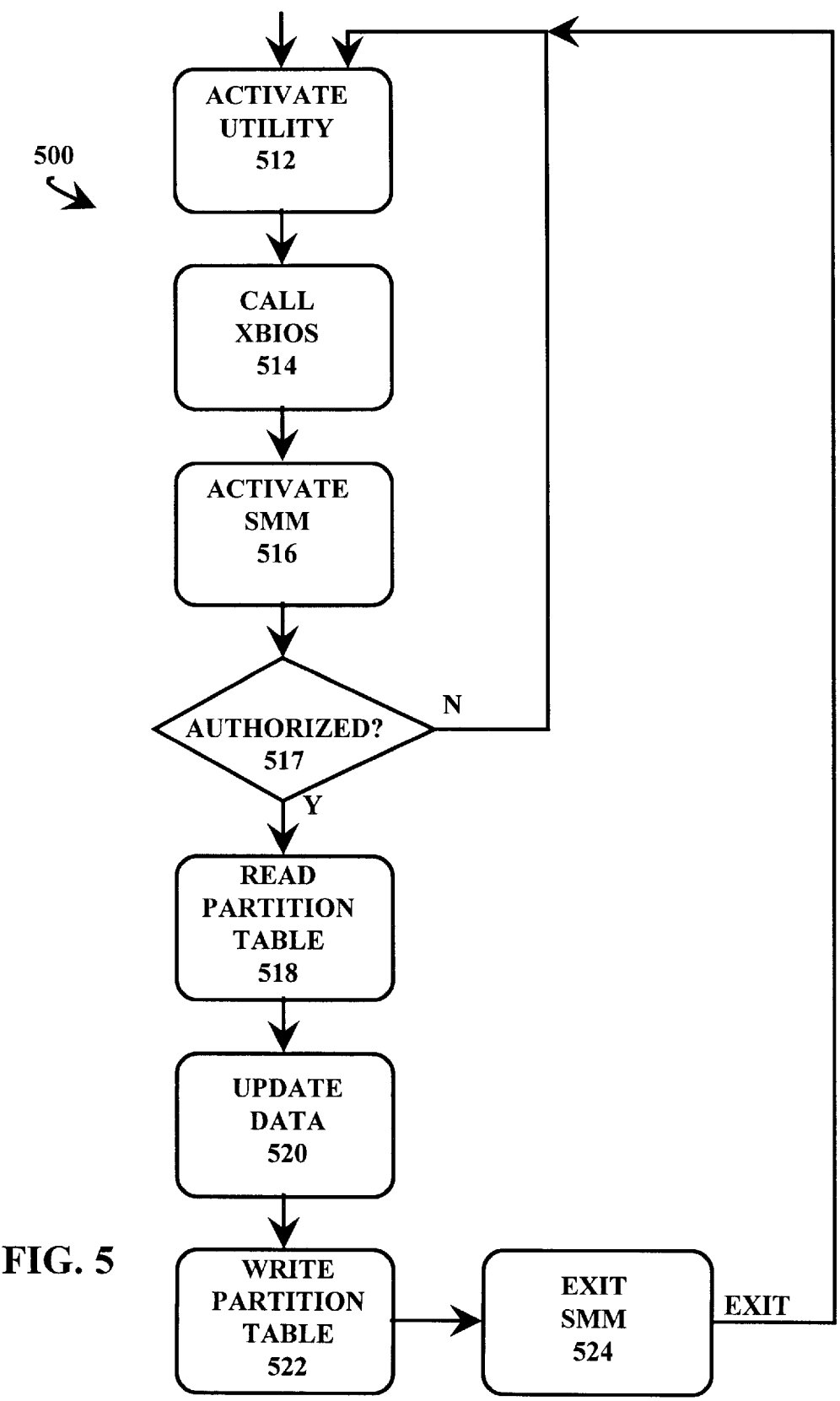
FIG. 5 is a flow chart showing operations executed by an essential utility which requests updating of a partition table in accordance with another embodiment of the present invention.

Referring to the flow chart of FIG. 5, operations of the functional blocks of an essential utility program 500 that requests updating of the partition table are shown. The essential utility program is activated, typically by a computer user, in step 512, requesting the update of the partition table which is protected by an operating system such as Windows NT™, Windows 95™, OS/2™ operating system, and the like. An example of the essential utility program 512 is a make suspend to disk utility (MKS2D). The essential utility program 512 includes a code indicative of an XBIOS function request to update the partition table, and XBIOS operation begins in step 514. A code for activating system management mode (SMM) is included in the XBIOS operation 514. This code passes the function request for updating of the partition table to the SMM. Typically, the function request passed to the SMM is an address of a control block that includes program code for updating the partition table within the SMM code. The XBIOS operation 514 activates system management mode (SMM) operation 516, which first determines whether the control block address is indicative of an operation that the SMM is authorized to perform when called by an XBIOS operation. This authorization test facilitates secured operation of the computer system. If the operation is not authorized, SMM is exited in step 517 and program control loops back to the essential utility program 512. Otherwise, SMM, which performs the partition table updating function requested on the basis of the control block address that is passed to SMM. In this example, the control block address specifies that SMM first reads the partition sector by reading selected memories of the partition table in step 518, then changes data from the selected memories in step 520. The SMM subsequently writes the updated data back into the partition table in step 522. When the partition table updating operation is complete, SMM is exited in step 524 and program control loops back to the essential utility program 512. The essential utility program 512 continuously loops, passing a plurality of parameters which are written to the partition table, until terminated, awaiting additional servicing by the SMM operations 516, 518, 520 and 522 whenever an additional partition update control block address is passed to SMM.

Figure 6:
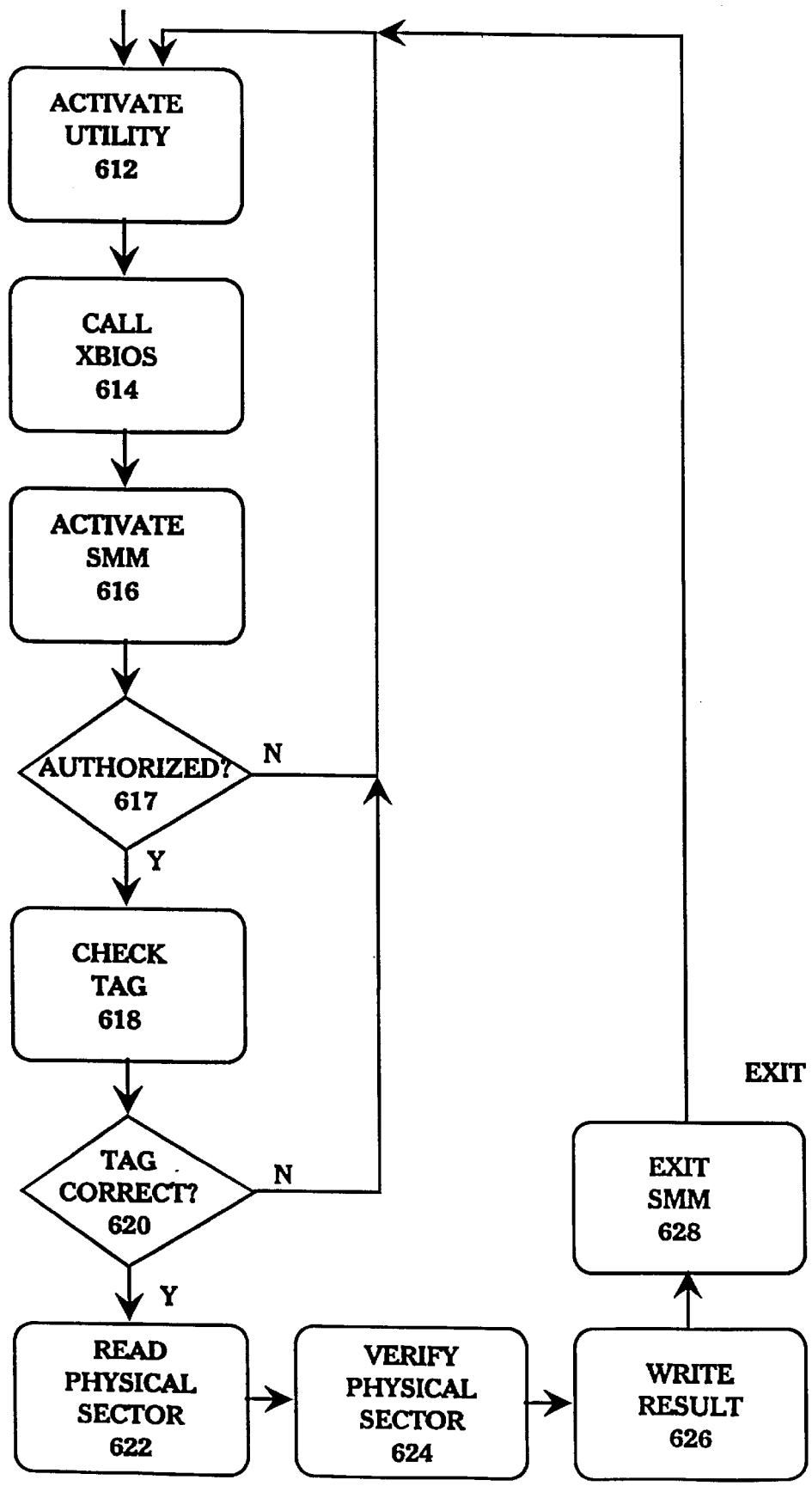
FIG. 6 is a flow chart depicting operations executed by an essential utility which locates physical sectors on a disk drive in accordance with another embodiment of the present invention.

Referring to the flow chart of FIG. 6, operations of the functional blocks of an essential utility program 600 that requests location and verification of physical sectors of a disk drive are shown. Protection of the disk drive is maintained since writing of the disk drive is not allowed and location data is not returned. The essential utility program 600 simply verifies that a selected physical sector matches a particular pattern. Security of this operation is enforced by the system management mode (SMM) which does not permit verification unless a suitable tag is passed to the SMM by the calling XBIOS routine. The essential utility program is activated, typically by a computer user, in step 612, requesting verification of a physical sector of a disk drive. The physical drive is protected by an operating system such as Windows NT™, Windows 95™, OS/2™ operating system, and the like. An example of the essential utility program 612 is a make suspend to disk utility (MKS2D). The essential utility program 612 includes a code indicative of an XBIOS function request to verify a physical sector of the disk drive, and XBIOS operation begins in step 614. A code for activating system management mode (SMM) is included in the XBIOS operation 614. This code passes the function request for verifying the physical sector to the SMM. Typically, the function request passed to the SMM is an address of a control block that includes program code for verifying a physical sector of the disk drive within the SMM code. The XBIOS operation 614 also passes a tag to the SMM that allows the verification to proceed. Furthermore, the XBIOS operation 614 passes to the SMM a sector number identifying the physical sector to be verified and a sector image, a verification pattern that is compared by the SMM to the physical sector. The XBIOS operation 614 activates system management mode (SMM) operation 616, which first determines whether the control block address is indicative of an operation that the SMM is authorized to perform when called by an XBIOS operation. This authorization test facilitates secured operation of the computer system. If the operation is not authorized, SMM is exited in step 617 and program control loops back to the essential utility program 612. Otherwise, SMM performs the physical sector verification function requested on the basis of the control block address that is passed to SMM. In this example, the control block address specifies that SMM first checks the tag sent by the XBIOS operation in step 618. If the tag is incorrect, SMM is exited in step 620 and program control loops back to the essential utility program 612. Otherwise, the SMM reads the selected physical sector by reading selected memories of the physical sector in step 622. In step 624, SMM then verifies the physical sector by comparing the requested sector with the verification pattern sent by XBIOS. The SMM subsequently writes a result which is simply indicative of whether the verification is affirmed or disaffirmed in step 626. When the physical sector verification is complete, SMM is exited in step 628 and program control loops back to the essential utility program 612. The essential utility program 612 continuously loops until terminated, awaiting additional servicing by the SMM operations 616, 618, 620, 622, 624 and 628 whenever an additional physical sector verification control block address is passed to SMM.

Thus, the utility program 600 for requesting location and verification of physical sectors of a disk drive advantageously includes many protection aspects. First, verification is not permitted unless a suitable tag is passed to the SMM by the calling XBIOS routine. Second, no operation is performed by SMM unless the operation identifier, typically a code block address, corresponds to an authorized operation. Third, the requested operation is only performed if the physical sector identifier sent from the XBIOS to the SMM corresponds to an existing physical sector of the drive. Fourth, the utility program 600 does not reveal the contents of the physical sector on the drive. Instead, the utility program 600 simply verifies that the contents of the physical sector of the drive matches a previously known pattern. Fifth, nothing is written to any physical sector of a drive so that no corruption of data takes place with the verification process.

Figure 7:
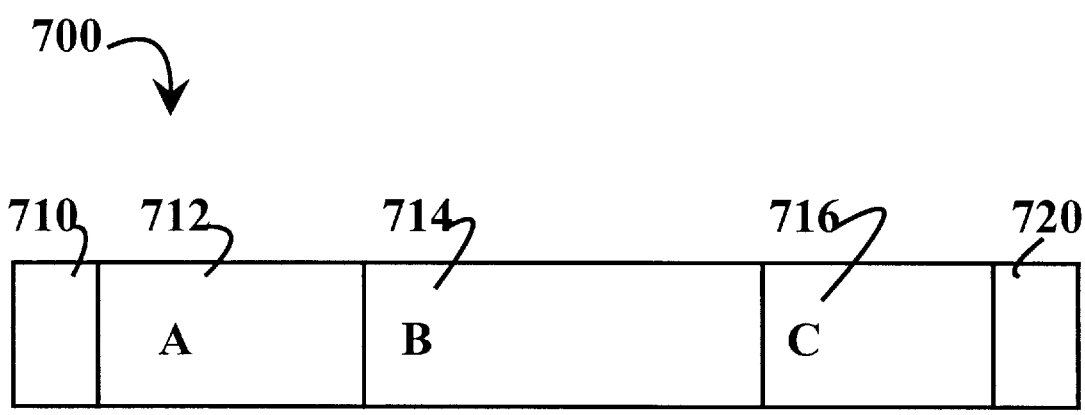
FIG. 7 is a pictorial representation of partitions in a disk drive storage.

The utility program 600 for requesting location and verification of physical sectors of a disk drive is used for various purposes. For example, the utility program 600 is called by a make suspend to disk (MKS2D) utility which stores contents of memory to the disk drive during power down, pending subsequent restoration of the memory. The partition sector holds information about individual partitions according to partition entries stored in a partition table. FIG. 7 is a pictorial representation of partitions in a disk drive storage 700 including a partition sector 710 and partitions A 712, B 714 and C 716. Operating systems generally only access logical sectors within the partition. Physical sectors are only accessed by the BIOS or by directly programming the processor. This limited accessibility protects the data of other operating systems against programming errors from programs running under the operating systems.

The MKS2D utility writes memory data to unused storage of the physical disk drive and therefore uses the utility program 600 to locate this unused storage. Information available to the MKS2D utility includes the location of logical sectors of the drive and the information that is written in these logical sectors. What is not known is the location of physical sectors of the drive, although the logical sector locations furnish an approximate location of the physical sectors. The utility program 600 may be used to precisely locate the physical sectors.

Figure 8:
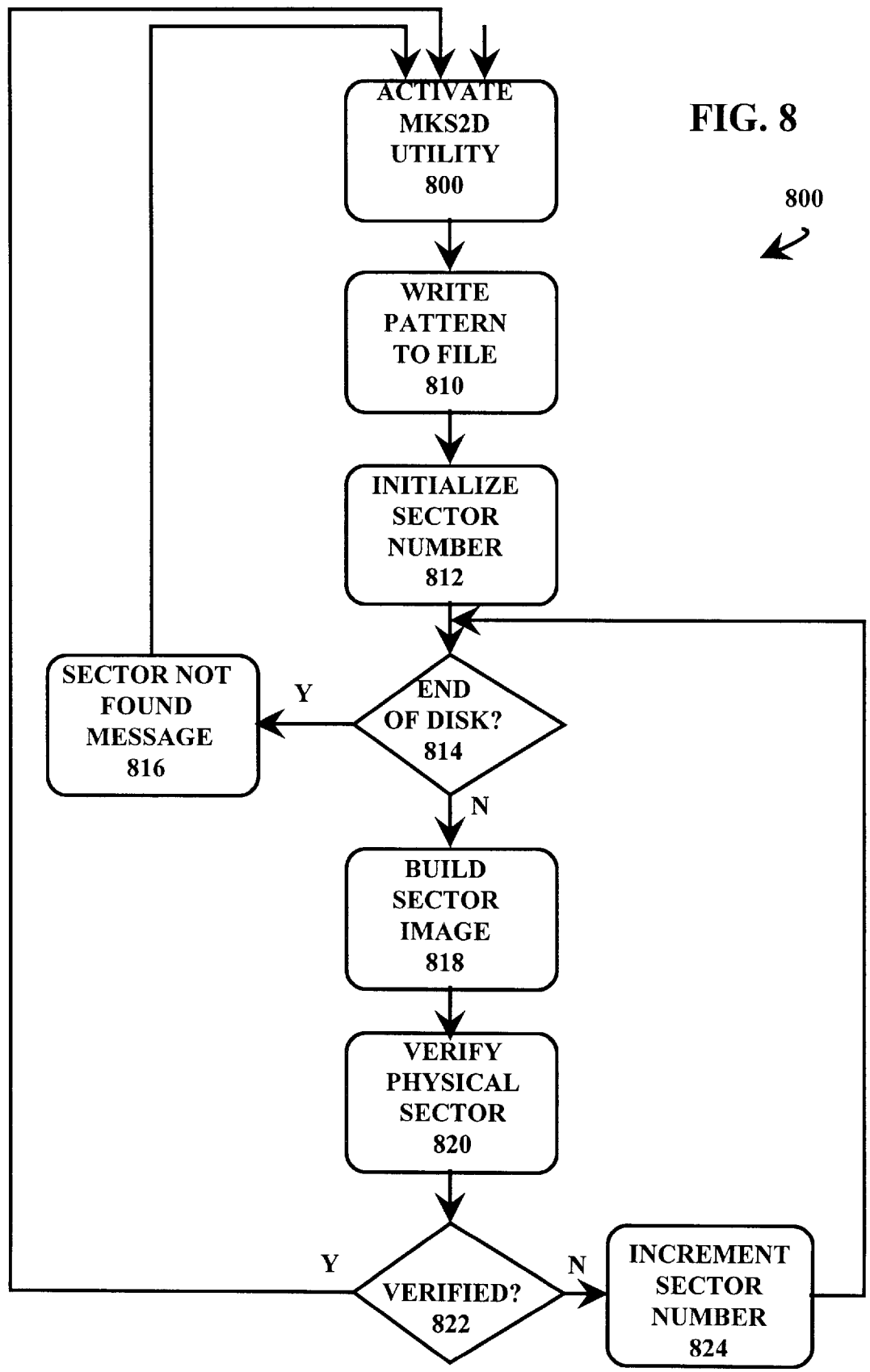
FIG. 8 is a flow chart which illustrates operations performed by a make suspend to disk (MKS2D) utility using an essential utility for locating physical sectors on a disk drive.

Referring to FIG. 8, a flow chart illustrates operations performed by a make suspend to disk (MKS2D) utility 800 using an essential utility for locating physical sectors on a disk drive. The MKS2D utility 800 writes a file to a disk drive under the control of an operating system, then uses the utility program 600 to determine the physical locations of the file on the disk drive. The MKS2D utility 800 begins in step 810 by writing a file with a defined pattern. Thus, the defined pattern is written to logical sectors of the drive. In step 812, MKS2D initializes the physical sector number of the drive to zero to begin verification. The physical sector number is initialized so that the physical sectors of the file are scanned and compared to the defined pattern written to the logical file, thereby locating the physical drive sectors with respect to the logical drive sectors. Step 814 determines whether the physical sector number corresponds to the end of the physical disk. If the physical sector number does correspond to the end of the physical disk, step 816 issues a message that the sector was not found and returns to the beginning of the MKS2D utility 800. Otherwise, the end of the physical disk is not reached and the utility builds a sector image in step 818. The sector image is subsequently used to verify sectors of the physical disk. Next, in step 820, the utility program for locating and verifying physical sectors, which is substantially the same as the utility program 600 shown in FIG. 6, utilizes the XBIOS to verify the sector number and the sector image of a physical sector of the disk drive. If the sector is verified in step 822, the routine returns to the beginning of the MKS2D utility 800. Otherwise, step 824 increments the sector number and branches to step 814, which determines whether the physical sector number corresponds to the end of the physical disk.

Figure 9:
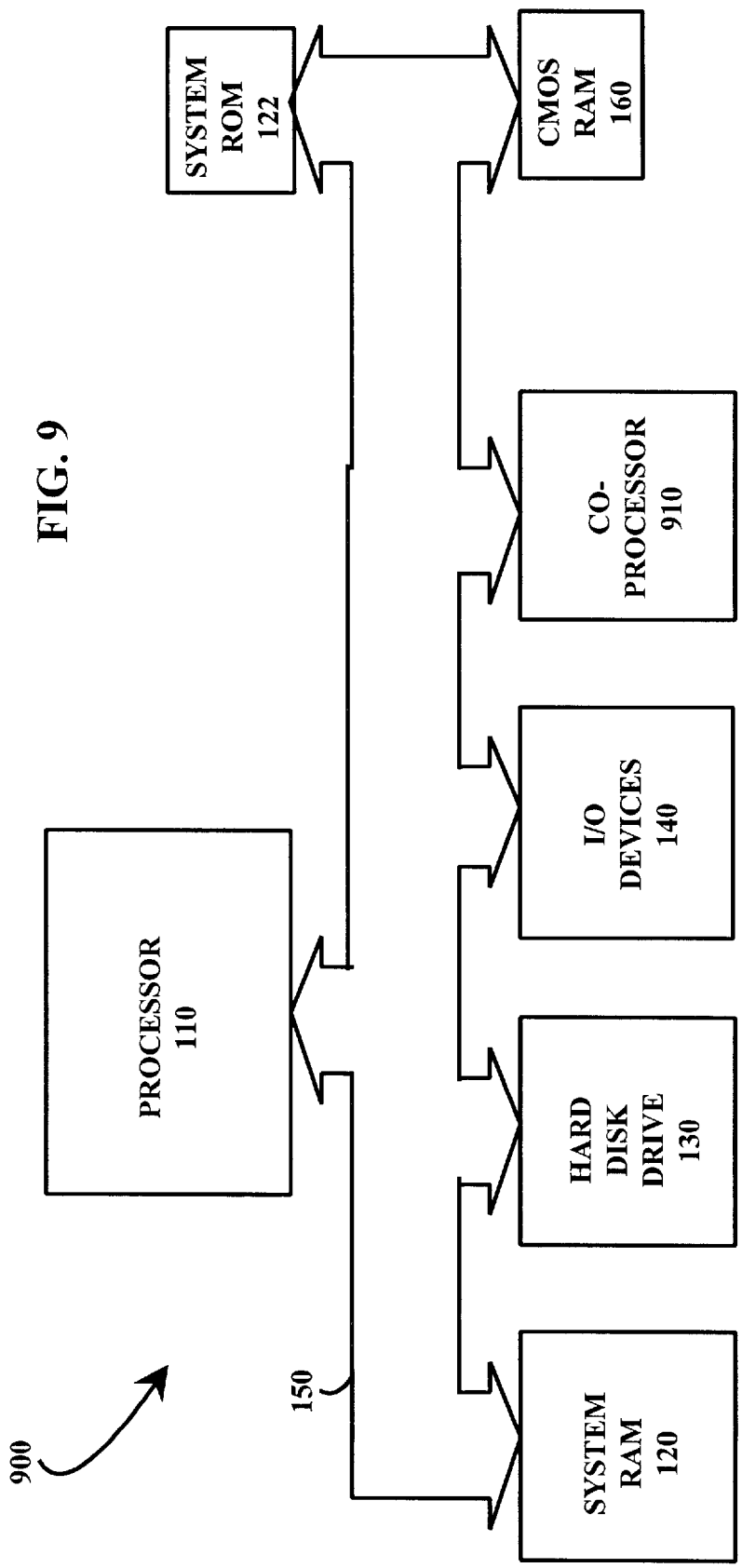
FIG. 9 is a block diagram which illustrates an alternative embodiment of a computer system hardware implementing an operating system independent method for avoiding operating system security for operations performed by essential utilities.

Referring to FIG. 9, a computer system 900 is shown which runs a system for creating an operating system independent environment for executing utility programs. The computer system 900 is substantially similar to the computer system 100, shown in FIG. 1 except that computer system 900 includes a coprocessor 910 that is connected to the bus 150. The coprocessor 910 performs substantially the same coprocessor function as the system management mode (SMM) coprocessor.

While the invention has been described with reference to various embodiments, it will be understood that these embodiments are illustrative and that the scope of the invention is not limited to them. Many variations, modifications, additions and improvements of the embodiments described are possible. For example, in the described embodiments, SMM is activated by XBIOS calls. XBIOS activation is advantageous since, for security reasons, codes and keys for activating SMM may not be generally known. In other embodiments, SMM may be activated using other techniques and structures. For example, a timer may be utilized to active the SMM. The SMM may also be activated by various application routines so that, so long as the codes and keys for accessing SMM are known at the application routine level, XBIOS is not needed to perform the described operations.

Furthermore, the embodiments are described as systems for circumventing various protection and security features of the Windows NT™, Windows 95™, and OS/2™ operating systems. The invention is applicable with reference to other operating systems employing similar security measures. Furthermore, the described embodiments discuss the usage of general purpose registers for communicating the polling signal. In other embodiments, other various types of temporary storage cells are applicable so long as these cells are not overwritten by the operating system.

What is claimed is:

1. A utility operating on a computer system having a processor operating under an operating system and a storage, the operating system including software limiting access to the storage, the utility comprising:
    a coprocessor coupled to the storage and operative independent of the operating system for accessing the storage;
    a software interface coupled to the coprocessor and executing on the processor to control input and output operations on the processor; and
    a utility routine executing on the processor and including a program code operative via the software interface for activating the coprocessor to access the storage and receiving a response from the coprocessor.

2. A utility according to claim 1 wherein the coprocessor is an external processor coupled to the processor via a bus.

3. A utility according to claim 1 wherein the coprocessor is a system management mode (SMM) system operatively coupled to the processor.

4. A utility according to claim 1 wherein the software interface is a basic input/output system (BIOS) operatively coupled to the processor.

5. A utility according to claim 1 wherein the software interface is an extension basic input/output system (XBIOS) operatively coupled to the processor.

6. A utility according to claim 1 wherein:
    the utility routine includes a routine for sending an activation code to the coprocessor which identifies an operation of the coprocessor; and
    the coprocessor includes a routine for verifying the activation code and terminating access to the storage when the activation code is not verified.

7. A utility according to claim 1 wherein:
    the utility routine includes a routine for sending an activation code to the coprocessor via the software interface which identifies an operation of the coprocessor; and
    the software interface includes a routine for verify the activation code and terminating access to the storage when the activation code is not verified.

8. A utility according to claim 1 wherein:
    the utility routine includes a routine requesting the coprocessor to update a storage element of the storage; and
    the coprocessor includes a routine for reading the storage element of the storage, updating the data read from the storage element and writing the updated data to the storage element.

9. A utility according to claim 1 wherein:
    the utility routine includes a routine requesting the coprocessor to update a partition table of the storage; and
    the coprocessor includes a routine for reading the partition table of the storage, updating the data read from the partition table and writing the updated data to the partition table.

10. A utility according to claim 1 wherein:
    the utility routine includes a routine requesting the coprocessor to verify a physical sector of the storage, the utility routine sending a sector identifier and a pattern to the coprocessor; and
    the coprocessor includes a routine for verifying contents of the storage at the identified sector against the pattern.

11. A method operating on a computer system having a processor operating under an operating system and a storage, the operating system including software limiting access to the storage, the method comprising the steps of:
    accessing the storage via a coprocessor operating independently of the operating system;
    controlling input and output operations on the processor using a software interface coupled to the coprocessor and executing on the processor; and
    activating the coprocessor to access the storage using a utility routine executing on the processor and including a program code operative via the software interface.

12. A method according to claim 11 further comprising the step of:
    receiving a response from the coprocessor.

13. A method according to claim 11 wherein the coprocessor is an external processor coupled to the processor via a bus.

14. A method according to claim 11 wherein the coprocessor is a system management mode (SMM) system operatively coupled to the processor.

15. A method according to claim 11 wherein the software interface is a basic input/output system (BIOS) operatively coupled to the processor.

16. A method according to claim 11 wherein the software interface is an extension basic input/output system (XBIOS) operatively coupled to the processor.

17. A method according to claim 11 wherein:
    the coprocessor activating step includes the substep of sending an activation code to the coprocessor, the activation code identifying an operation of the coprocessor; and
    the storage accessing step includes the substeps of verifying the activation code and terminating access to the storage when the activation code is not verified.

18. A method according to claim 11 wherein:
    the coprocessor activating step includes a substep of sending an activation code to the coprocessor via the software interface, the activation code identifying an operation of the coprocessor; and
    the input and output operations controlling step further includes the substeps of verifying the activation code and terminating access to the storage when the activation code is not verified.

19. A method according to claim 11 wherein:
    the coprocessor activating step includes a substep of requesting the coprocessor to update a storage element of the storage; and
    the storage accessing step includes the substeps of reading the storage element of the storage, updating the data read from the storage element and writing the updated data to the storage element.

20. A method according to claim 11 wherein:

the coprocessor activating step includes a substep of requesting the coprocessor to update a partition table of the storage; and the storage accessing step includes the substeps of reading the partition table of the storage, updating the data read from the partition table and writing the updated data to the partition table.

21. A method according to claim 11 wherein:

the coprocessor activating step includes a substep of requesting the coprocessor to verify a physical sector of the storage, the utility routine sending a sector identifier and a pattern to the coprocessor; and the storage accessing step includes a substep of verifying contents of the storage at the identified sector against the pattern.

22. A utility operating on a computer system having a processor operating under an operating system and a storage, the operating system including software limiting access to the storage, the utility comprising:

a coprocessor coupled to the storage and operative independent of the operating system for accessing the storage;

means coupled to the coprocessor and executing on the processor for controlling input and output operations on the processor; and means executing on the processor and including a program code operative via the software interface for activating the coprocessor to access the storage and receiving a response from the coprocessor.

* * * * *